US009445577B2

(12) United States Patent
Jones et al.

(10) Patent No.: US 9,445,577 B2
(45) Date of Patent: Sep. 20, 2016

(54) ELEVATED FEEDING TRAY APPARATUS

(71) Applicant: Act 3 Ventures Inc., Atlanta, GA (US)

(72) Inventors: Patricia M. Jones, Atlanta, GA (US); Michael Haddad, Decatur, GA (US)

(73) Assignee: ACT 3 VENTURES INC., Atlanta, GA (US)

( * ) Notice: Subject to any disclaimer, the term of this patent is extended or adjusted under 35 U.S.C. 154(b) by 0 days.

(21) Appl. No.: 14/019,960

(22) Filed: Sep. 6, 2013

(65) Prior Publication Data

US 2015/0068460 A1 Mar. 12, 2015

(51) Int. Cl.
*A01K 5/01* (2006.01)

(52) U.S. Cl.
CPC .................................... *A01K 5/0114* (2013.01)

(58) Field of Classification Search
CPC .... A01K 5/01; A01K 5/0107; A01K 5/0114; A01K 5/0121; A01K 5/0128; A01K 5/0135; A01K 7/005
USPC .............. 119/51.01, 51.5, 52.1, 58, 60, 61.1, 119/61.5, 61.57, 61.54; 229/104, 115; 206/557; 248/309.1, 311.2
See application file for complete search history.

(56) References Cited

U.S. PATENT DOCUMENTS

D24,173 S 4/1895 Arkinson et al.
D25,483 S 5/1896 Jonson
766,427 A 8/1904 Crowell
1,185,440 A * 5/1916 Schuetz ....................... 119/61.1
D96,018 S 6/1935 Cannon
2,239,969 A 4/1941 Morthland
D172,715 S 7/1954 Hogan
2,691,362 A * 10/1954 Moyer et al. ................ 119/61.1
2,812,891 A 11/1957 Carlson et al.
D182,235 S 3/1958 Jaffe
3,285,694 A 11/1966 Ferdinand
3,345,670 A 10/1967 Charie
3,611,998 A 10/1971 Loscalzo
D230,034 S 1/1974 Goldman et al.
D257,494 S 11/1980 Imhoff (Continued)

FOREIGN PATENT DOCUMENTS

GB 2373494 9/2002
JP 2010063422 * 3/2010
WO WO 03/069985 * 8/2003

OTHER PUBLICATIONS

Doca Pet, "Dogleg Diner", located at http://www.docapet.com/dogleg-diner.html, accessed on Jul. 22, 2013, 5 pgs.

(Continued)

*Primary Examiner* — Trinh Nguyen
(74) *Attorney, Agent, or Firm* — Taylor English Duma LLP

(57) ABSTRACT

Disclosed is a self-supporting elevated feeding tray apparatus including a tray, a tray riser and a base, where the tray is watertight and the tray, tray riser, and base are integrally formed from the same material. Fill level indicia or marks allow a precise amount of food to be placed in the tray. Also disclosed is a blank for forming the elevated feeding tray apparatus including the panels that form the tray as well as a tray riser and a base. Also disclosed is a method of forming an elevated feeding tray apparatus including the steps of preparing a blank, bending the blank, forming an indentation in at least one bend, and making the seams between the side walls of the tray and at least one tray bottom panel watertight.

18 Claims, 4 Drawing Sheets

(56) References Cited

U.S. PATENT DOCUMENTS

D270,407 S 9/1983 Ochwat
D277,245 S 1/1985 Unverzagt
D279,445 S 7/1985 Jagger
4,584,966 A 4/1986 Moore
D287,772 S 1/1987 Stewart
D289,807 S 5/1987 Russell
4,800,845 A 1/1989 Budd
4,925,032 A 5/1990 Liles
4,973,018 A * 11/1990 Agor .......................... 248/309.1
D313,486 S 1/1991 Conner
D313,487 S 1/1991 Conner
5,046,633 A 9/1991 Chung
5,062,527 A 11/1991 Westerman
5,203,845 A 4/1993 Moore
D356,449 S 3/1995 Frye
D370,146 S 5/1996 Petronio
D377,430 S 1/1997 Hopwood
5,845,605 A 12/1998 Malamphy
D406,925 S 3/1999 Sharon
D409,448 S 5/1999 Hudson et al.
D412,605 S 8/1999 Sharon
D421,697 S 3/2000 Hollinger
D426,752 S 6/2000 Whaley
6,126,240 A 10/2000 Tse
D439,707 S 3/2001 Hansen
D442,831 S 5/2001 Jacobs
D448,978 S 10/2001 Isbell
D451,709 S 12/2001 Heithecker
D454,234 S 3/2002 Weterrings
D465,884 S 11/2002 Ross
D467,044 S 12/2002 Tangolics
D467,687 S 12/2002 Tangolics
D470,631 S 2/2003 Teufel
D471,406 S 3/2003 Wellner
D471,677 S 3/2003 Northrop
D472,021 S 3/2003 Northrop
D473,758 S 4/2003 Wilson
D477,691 S 7/2003 Crowley
6,588,367 B1 7/2003 MacManus
6,647,921 B2 11/2003 Stokes et al.
D494,325 S 8/2004 Paterson
D501,683 S 2/2005 Hernandez et al.
D502,294 S 2/2005 Hung
6,860,229 B1 3/2005 Craft
D504,196 S 4/2005 Huthmaker et al.
D506,644 S 6/2005 Poupel et al.
D514,750 S 2/2006 Matula
D515,878 S 2/2006 Czepowicz
D516,025 S 2/2006 Quinn
D540,623 S 4/2007 Schreiber-Pethan et al.
D547,615 S 7/2007 Wasserman et al.
D548,014 S 8/2007 Kell
D563,606 S 3/2008 Hood et al.
D564,844 S 3/2008 Schreiber-Pethan et al.
D584,967 S 1/2009 Shamoon
D586,611 S 2/2009 Solis et al.
D590,109 S 4/2009 Anderson et al.
D600,862 S 9/2009 Sin
D607,616 S 1/2010 Newsome et al.
D607,648 S 1/2010 Nanda
D613,999 S 4/2010 Sierra
D621,559 S 8/2010 Clark, Jr.
D623,359 S 9/2010 Kim
7,789,041 B1 9/2010 Taylor
D625,885 S 10/2010 Bianchi
D630,864 S 1/2011 Perelman
D634,167 S 3/2011 Foster
D636,945 S 4/2011 Anderson et al.
D642,025 S 7/2011 Scheurer
D646,442 S 10/2011 Chance et al.
D646,852 S 10/2011 Chance et al.
D647,502 S 10/2011 Holzer
8,056,145 B2 11/2011 Shamsnobari et al.
D653,000 S 1/2012 Rutherford
D653,474 S 2/2012 Garcia et al.
D659,300 S 5/2012 Lipscomb
D659,914 S 5/2012 Lipscomb
D662,939 S 7/2012 Akana et al.
D665,541 S 8/2012 Shamoon
D670,041 S 10/2012 Chance et al.
D676,710 S 2/2013 Kwok
8,381,684 B2 2/2013 Crawford
D685,619 S 7/2013 Sundaram
D687,938 S 8/2013 Furner et al.
D701,005 S 3/2014 Gilkey et al.
D703,393 S 4/2014 Henley
D709,654 S 7/2014 Lipscomb et al.
D712,524 S 9/2014 O'Grady
8,985,054 B2 3/2015 Lipscomb et al.
D726,981 S 4/2015 Yessin
D744,173 S 11/2015 Jones et al.
D744,174 S 11/2015 Jones et al.
D755,447 S 5/2016 Andrews
D757,373 S 5/2016 Breit
D758,674 S 6/2016 Youn
2003/0066937 A1 4/2003 Smith
2005/0039689 A1 2/2005 Mossmer
2005/0039690 A1* 2/2005 Sage, Jr. ...................... 119/61.5
2006/0005775 A1* 1/2006 Ritchey et al. ............. 119/61.5
2006/0027178 A1 2/2006 Stephens
2006/0113200 A1 6/2006 Abkarian
2007/0089678 A1 4/2007 Greenwood
2007/0284423 A1 12/2007 Fioritti
2009/0126641 A1 5/2009 Anderson et al.
2010/0275852 A1 11/2010 Lipscomb et al.
2014/0346293 A1 11/2014 Qiu
2014/0352621 A1 12/2014 Fairbanks
2015/0059652 A1 3/2015 Rabideau
2015/0101543 A1 4/2015 Baxter et al.

OTHER PUBLICATIONS

Pets Stop, "Cantilever Double Diners", located at http://www.petsstop.com/product.php?id=547&paso=1, accessed on Jul. 22, 2013, 5 pgs.

Serafin, Mike; "Bent Soap Dish", located at http://www.memikeserafin.com/110810/973737/work/bent-soap-dish, accessed on Jul. 25, 2013, 5 pgs.

Jones, Patricia M.; Design Patent Application entitled: Elevated Dog Bowl having U.S. Appl. No. 29/521,229, filed Mar. 20, 2015, 7 pgs.

Jones, Patricia M.; Design Patent Application entitled: Elevated Pet Bowl having U.S. Appl. No. 29/521,231, filed Mar. 20, 2015, 7 pgs.

Jones, Patricia M.; Corrected Notice of Allowability for U.S. Appl. No. 29/521,229, filed Mar. 20, 2015, mailed Oct. 20, 2015, 9 pgs.

Jones, Patricia M.; Corrected Notice of Allowability for U.S. Appl. No. 29/521,231, filed Mar. 20, 2015, mailed Oct. 20, 2015, 4 pgs.

Jones, Patricia M.; Issue Notification for U.S. Appl. No. 29/521,229, filed Mar. 20, 2015, mailed Nov. 4, 2015, 1 pg.

Jones, Patricia M.; Issue Notification for U.S. Appl. No. 29/521,231, filed Mar. 20, 2015, mailed Nov. 4, 2015, 1 pg.

Jones, Patricia M.; U.S. Patent Application entitled: Elevated Cat Bowl having U.S. Appl. No. 29/546,665, filed Nov. 24, 2015, 6 pgs.

Jones, Patricia M.; Notice of Allowance for U.S. Appl. No. 29/521,229, filed Mar. 20, 2015, mailed Jul. 15, 2015, 13 pgs.

Jones, Patrica M.; Notice of Allowance for U.S. Appl. No. 29/521.231, filed Mar. 20, 2015, mailed Jul. 20, 2015, 18 pgs.

Dylankendall.com Paw Footed Bowls, Sep. 2013; 1 page.

Lakeside.com, Paw footed feeder stands, 2015, 1 page.

Jones, Patricia M.; U.S. Patent Application entitled: Elevated Feeding Tray Apparatus, having U.S. Appl. No. 15/075,087, filed Mar. 18, 2016, 63 pgs.

Jones, Patricia M.; Notice of Allowance for U.S. Appl. No. 29/546,665, filed Nov. 24, 2015, mailed , Jun. 24, 2016, 23 pgs.

* cited by examiner

ELEVATED FEEDING TRAY APPARATUS

TECHNICAL FIELD

This disclosure relates to a tray for feeding. More specifically, this disclosure relates to an elevated tray for feeding domesticated animals such as dogs and cats.

BACKGROUND

It is sometimes desirable for a domesticated animal such as a dog or cat to be able to feed itself with food prepared by its caregiver. An animal that feeds itself, however, can get itself or the surrounding area messy during the feeding process. In addition, some animals can become anxious or frightened by not being able to monitor their surroundings. Such animals may feel that they must alternate between feeding and monitoring in order to feel safe because they cannot typically do both activities at the same time. These are just two of the problems that can be encountered by domesticated animals in feeding themselves.

SUMMARY

Disclosed is an elevated feeding tray apparatus including a tray defining a feeding cavity; a tray riser, and a base, where the tray, tray riser, and base are integrally formed from the same material.

Also disclosed is a blank for forming an elevated feeding tray apparatus including a tray bottom panel, the tray bottom panel including a left end, a right end distal to the left end, a top end, and a bottom end, a first side wall connected to the left end of the tray bottom panel, a second side wall connected to the right end of the tray bottom panel, a tray riser connected to the top end of the tray bottom panel, and a base connected to the tray riser.

Also disclosed is a method of forming an elevated feeding tray apparatus including the steps of preparing a blank, the blank including a tray bottom panel, two tray side walls, a tray riser, and a base, the base panel connected to the tray riser, the tray riser connected to the tray bottom panel, and the tray bottom panel connected to the two tray side walls; bending the blank to form a bend between the tray bottom panel and each of the two tray side walls; bending the blank to form a bend between the tray riser and the tray bottom panel, and bending the blank to form a bend between the base and the tray riser Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is an elevated feeding tray apparatus and associated methods, systems, devices, and various apparatus. It would be understood by one of skill in the art that the disclosed elevated feeding tray apparatus is described in but a few exemplary embodiments among many. No particular terminology or description should be considered limiting on the disclosure or the scope of any claims issuing therefrom.

Figure 1:
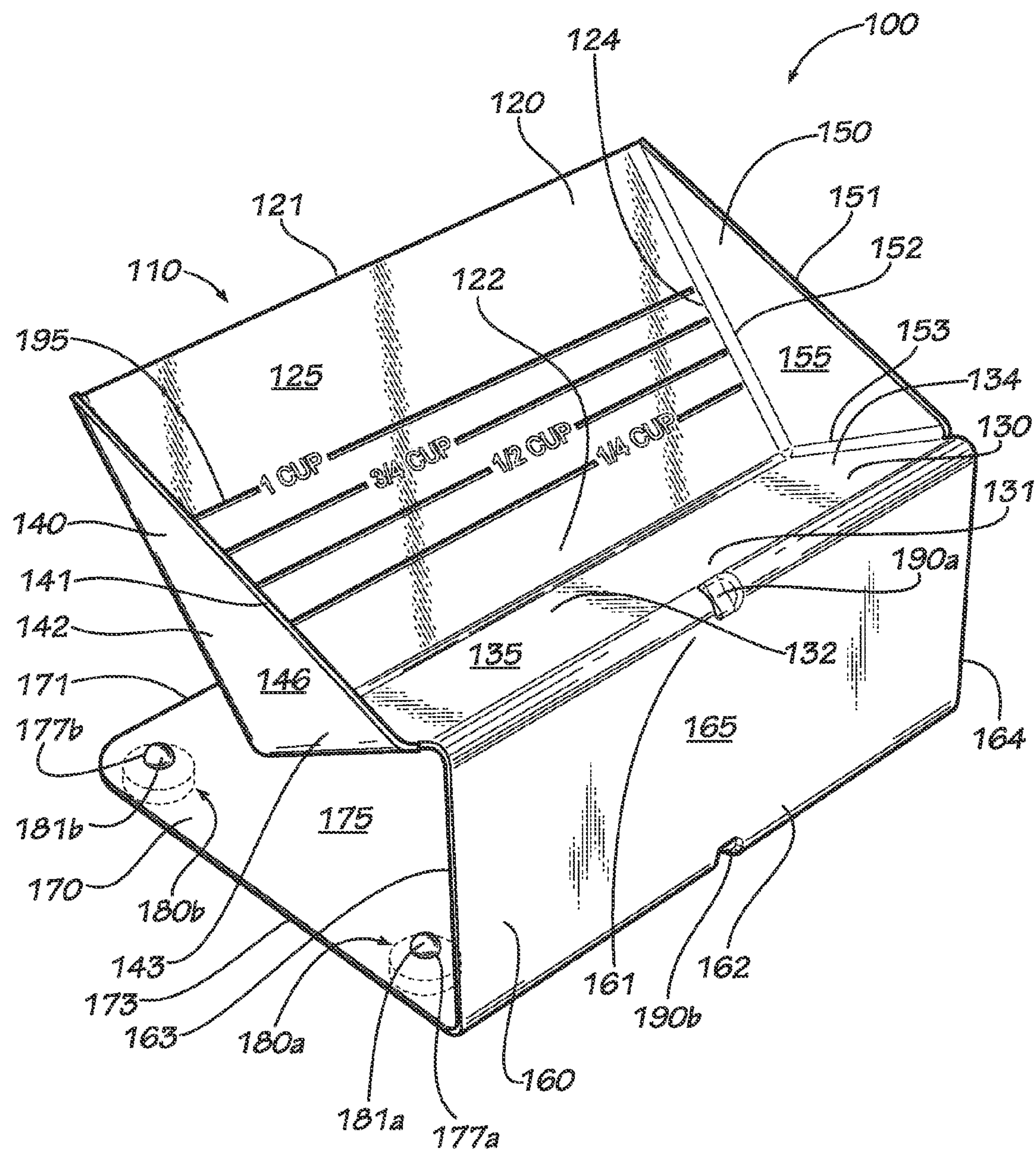
FIG. 1 is a perspective view of one embodiment of an elevated feeding tray apparatus according to the present disclosure.

One embodiment of the elevated feeding tray apparatus is disclosed and described in FIG. 1. An elevated feeding tray apparatus 100 includes a tray 110, a tray riser 160, a base 170, and feet 180*a,b,c,d* (180*c,d* shown in FIG. 1.). The tray 110, the tray riser 160, and the base 170 of the current embodiment are made from a single material and formed as an integral body. While this embodiment also shows the tray 110, the tray riser 160, and the base 170 made from a single continuous blank of a single material, in other embodiments the tray 110, the tray riser 160, and the base 170 could be fabricated using more than one component joined together. In the process of describing the embodiments of the elevated feeding tray apparatus 100, tray riser 160 may be described as tray riser panel 160 and base 170 may be described as base panel 170. In various embodiments, the feet 180*a,b,c,d* could be formed as part of the base 170. One of ordinary skill in the art will appreciate that joining the tray 110, the tray riser 160, and the base 170 could be accomplished using a number of different methods, including but not limited to welding or fastening through the use of rivets or other fasteners. Forming the tray 110, the tray riser 160, and the base 170 from a single continuous blank of a single material as in the current embodiment could be accomplished through the use of sheet metal such as 16 gage polished stainless steel. However, other grades and thicknesses of sheet metal or plastic or other suitable materials could be used as well. In addition, the elevated feeding tray apparatus 100 could be molded inside a die using a process such as injection molding, wherein the tray 110 could be optionally and additionally supported by a tray riser 160 that supports any one or more of the outer surfaces 126, 136, 146 or 156 (126, 136, and 156 shown in FIG. 6) of the tray 110 in addition to supporting the tray 110 in a cantilever fashion as shown.

Fabricating the elevated feeding tray apparatus 100 from a flat blank 600 (shown in FIG. 6) may result in the creation of external bend radii and may also result in the creation of internal bend radii. The external bend radii and internal bend radii exist in the present embodiment as shown in the figures but may not be present in other embodiments. The external bend radii and internal bend radii may be desired in order to improve cleanability and safety of the elevated feeding tray apparatus 100 due to the presence of smooth inside and outside corners instead of sharp inside and outside corners. Internal radii may improve cleanability and therefore also safety by the elimination of difficult-to-reach crevices, including on the inside of the cavity formed by tray 110 after forming. External radii may improve safety by the elimination of sharp corners that might otherwise become a hazard in some feeding, handling, or cleaning situations. For at least this reason and for increased manufacturability, a part molded inside a die, for example, instead of being bent from a flat blank such as flat blank 600, may also have these radii included.

Tray 110 of the disclosed embodiment includes a rear bottom panel 120, a front bottom panel 130, a first side wall 140, and a second side wall 150. Tray 110 may have any number of bottom panels, and the selection of two bottom panels for the current embodiment should not connote any preference for any number of panels or for the shape of each panel. For example, there could be one continuous curved bottom panel replacing the rear bottom panel 120 and front bottom panel 130 of the current embodiment. In the current embodiment, the rear bottom panel 120 and front bottom panel 130 each have a top end, a bottom end, a left end, and a right end. Rear bottom panel 120 includes a top end 121, a bottom end 122, a left end 123 (shown in FIG. 5), and a right end 124. Front bottom panel 130 includes a top end 131, a bottom end 132, a left end 133 (shown in FIG. 5), and a right end 134. The rear bottom panel 120 and front bottom panel 130 are arranged in a "V" configuration such that the bottom end 122 of rear bottom panel 120 is connected to the bottom end 132 of front bottom panel 130 and the top ends 121, 131 are both higher than the bottom ends 122, 132 when the elevated feeding tray apparatus 100 is positioned as shown in FIG. 1 with base 170 resting on a horizontal surface.

In all of the various embodiments described, "front" and "rear" are used for convenience to differentiate the location of parts of the elevated feeding tray apparatus 100 that are in different positions relative to the user, whether it be the animal or its caregiver. Where these terms are used, the standard convention is to describe those components of the apparatus 100 that are closer to the animal when using the apparatus 100 with the "front" descriptor and to describe those components of the apparatus 100 that are further form the animal when using the apparatus 100 with the "rear" descriptor. Specifically in the embodiments as shown in the drawings and for purposes of defining the apparatus 100, the animal is assumed to be facing front surface 165 of tray riser 160 since this would be typical during use.

Each bottom panel of the current embodiment has a flat outer surface and a flat inner surface. Rear bottom panel 120 has an inner surface 125 and an outer surface 126 (shown in FIG. 3). Front bottom panel 130 has an inner surface 135 and an outer surface 136 (shown in FIG. 2). Although rear bottom panel 120 and front bottom panel 130 are both shown as rectangular in shape, rear bottom panel 120 and front bottom panel 130 may be of other shapes instead.

In the current embodiment, connected to the rear bottom panel 120 and front bottom panel 130 are first side wall 140 and second side wall 150. The second side wall 150 is distal to the first side wall 140. The first side wall 140 has a top end 141, a rear bottom end 142, and a front bottom end 143. The second side wall 150 has a top end 151, a rear bottom end 152, and a front bottom end 153.

Each side wall of the current embodiment has a flat outer surface and a flat inner surface. First side wall 140 has an inner surface 145 (shown in FIG. 5) and an outer surface 146. Second side wall 150 has an inner surface 155 and an outer surface 156 (shown in FIG. 6). Each side wall is substantially triangular in shape in the current embodiment to match the V-shaped profile formed by the rear bottom panel 120 and front bottom panel 130 when viewed from the side; however, each side wall could alternately be made in other shapes to match alternate profiles that could be created by the bottom panels, including bottom panel(s) that are fewer or greater in number than that shown in the current embodiment. In other embodiments, the side walls may also be increased in height, decreased in height or removed altogether.

A seam is formed at the intersection of the left end 123 of rear bottom panel 120 and the rear bottom end 142 of first side wall 140. The seam can be sealed by welding or by some other method such as a durable food-grade caulk. Welding, if used, can take the form of any one of several process types including but not limited to tungsten inert gas (TIG) welding and metal inert gas (MIG) welding. During the welding or caulking process, the radius may be formed by the filler material used during the process or may be formed ahead of time in the two or more panels being joined together to form a watertight seam. The seam formed at the intersection of the right end 124 of rear bottom panel 120 and the rear bottom end 152 of second side wall 150 can be sealed by a similar method. Making tray 110 watertight by welding or another method makes it possible for the tray to hold not only solid foods but also liquid foods or water without leaking. In yet other embodiments, the seam could be made tight or instead be left open without welding to produce a seam that is not watertight, or a stamping or drawing process could instead form some or all of tray 110 in order to eliminate some or all seams.

The rear bottom panel 120, the front bottom panel 130, the first side wall 140, and the second side wall 150 of tray 110 form a cavity. This cavity can be used to contain any solid or liquid material including solid food or even liquid food if the tray is made sufficiently watertight.

Connected to the top end 131 of front bottom panel 130 of tray 110 is tray riser 160. Tray riser 160 has a top end 161, a bottom end 162, a left end 163, and a right end 164. Tray riser 160 has a front surface 165 and a rear surface 166 (shown in FIG. 3). While tray riser 160 is substantially vertical in this embodiment, it may also form an angle with the horizontal that is more than or less than ninety degrees.

In the current embodiment shown in FIG. 1, tray 110 is cantileverly supported off tray riser 160. In other words, the top front edge of tray 110 is connected to and supported off the top end 161 of tray riser 160 in a similar way that a cantilever beam is supported off a wall.

Connected to the bottom end 162 of tray riser 160 is base 170. Base 170 has a rear end 171, a front end 172 (shown in FIG. 4), a left end 173, and a right end 174 (shown in FIG. 4). In addition, base 170 has a top surface 175 and a bottom surface 176 (shown in FIG. 4). Base 170 also has cutouts 177*a,b,c,d* (177*c,d* shown in FIG. 6) for insertion of feet 180*a,b,c,d* (180*c,d* shown in FIG.). Feet 180*a,b,c,d* include insert portion 181*a,b,c,d* and foot portion 182*a,b,c,d*. Stiffening of the intersection of tray riser 160 and front bottom panel 130 or the intersection of tray riser 160 and base 170—specifically a bend in the current embodiment although in other embodiments the intersection may take on other forms—is possible through the addition of upper indentation 190*a* or lower indentation 190*b* or both. There may be multiple instances of upper indentation 190*a* or lower indentation 190*b* or both in order to increase the stiffness further. Indentations 190*a,b* can be any disruption or interruption in a bend or similar intersection between two panels that causes the material at the bend to be deformed or to otherwise have a different shape in one localized area. One or more indentations 190*a,b* will cause the tray 110 to be able to support more weight while limiting the movement of the tray 110 with respect to the tray riser 160 and base 170 and the movement of tray riser 160 with respect to base 170. Indentations 190*a,b*, or any equivalent, are not present in some embodiments In the current embodiment, fill level indicia 195 are etched into inner surface 125 of rear bottom panel 120. However, fill level indicia 195 may be placed on any surface of the tray. For purposes of describing the apparatus, to "place on" the surface means to make visible on the surface through any process, including but not limited to etching, engraving, carving, cutting, stamping, indenting, embossing, painting, or printing, either directly on the material of the tray or on a separate piece of material such as a label that is affixed to an outer surface of the tray. To illustrate in the case of a tray such as tray 110 that is made from a translucent material, the fill level indicia 195 could be printed in reverse on a label affixed to an outer surface 126, 136, 146, or 156 and be visible to someone viewing through an inner surface 125, 135, 145, or 155 of the tray 110. As described above, the fill level indicia 195 may also be made to facilitate cleanability by eliminating recesses in the surface that might collect food. Eliminating recesses in fill level indicia 195 could be accomplished by filling any etched areas with a filler material such as but not limited to colored epoxy or by using any process of placing fill level indicia 195 on the surface that does not create recesses.

The fill level indicia 195 allow a precise amount of food to be placed in the tray 110 as may be desired. It may be desirable to be able to feed an animal a precise amount of food in order to promote its proper growth or overall health. The individual quantity, location and type of lines and figures making up fill level indicia 195 may vary in order to accommodate different sizes of tray 110, different levels of precision, different levels of readability, different languages or identifying marks that are universal between markets in which different languages are used. It should also be noted that additional lines and figures could be etched or otherwise marked on the surface of the tray 110 or any portion of the elevated feeding tray apparatus 100 in order to communicate information about the product itself such as product brand, product manufacturer, date of manufacture, issued patent number, and brand website. Depending on the process used to produce the markings, some or all of fill level indicia 195 and any other accompanied marking could be incorporated during or after production of the elevated feeding tray apparatus 100.

All panels making up the elevated feeding tray apparatus 100 of the current embodiment are substantially planar but need not remain so in other embodiments. Each panel except for the base panel 170 for example, could be formed to curve inwardly or outwardly. The base panel 170 could formed to curve inwardly or outwardly if it does not cause the elevated feeding tray apparatus 100 as a whole to become unstable.

Figure 2:
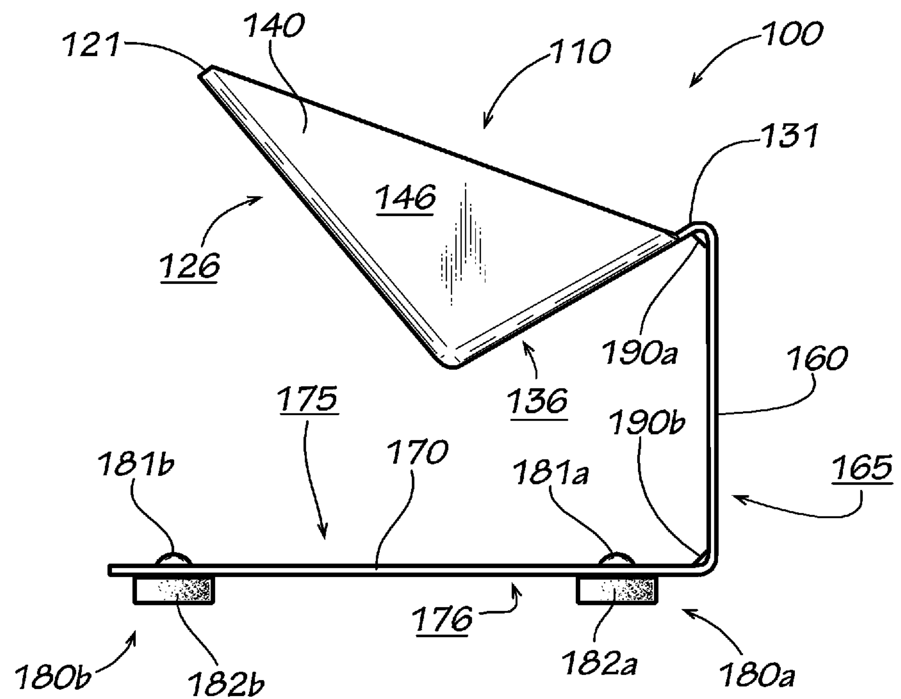
FIG. 2 is a side view of the elevated feeding tray apparatus of FIG. 1.

FIG. 2 shows a side view of the elevated feeding tray apparatus 100 of FIG. 1. Clearly visible in this view are feet 180*a,b* including foot portions 182*a,b* and also insert portions 181*a,b* penetrating base 170 through cutouts 177*a,b*, respectively (shown in FIG. 6). Also visible in this view are tray 110, outer surface 146 of first side wall 140, tray riser 160, indentations 190*a,b* and surfaces 126, 165, 175 and 176.

The feet 180*a,b,c,d* in the current embodiment are made of a skid control material that is flexible and resists sliding. It can be desirable to secure a feeding container, including the elevated feeding tray apparatus 100 of this embodiment, so that it does not slide on the floor, especially during feeding, because such securement can help an animal feed itself without moving the container or overturning the container or otherwise spilling the contents of the container. An example of the kind of skid control material that would be flexible and resist sliding is ethylene propylene diene monomer (EPDM) rubber, although any material could be substituted including materials with a greater tendency or lesser tendency to resist sliding depending on the specific application and including but not limited to silicone rubber, natural rubber, polyurethane, styrene butadiene rubber (SBR), SANTOPRENE™ thermoplastic vulcanizate, and ethylene vinyl acetate (EVA). The feet 180*a,b,c,d* could be alternatively replaced with a screw, pin, or other fastener so that the elevated feeding tray apparatus 100 could be temporarily or permanently attached to any mounting surface or the feet 180*a,b,c,d* could be left out altogether.

It can also clearly be shown in FIG. 2 that top end 121 of rear bottom panel 120 (shown in FIG. 1) is positioned higher vertically than top end 131 of front bottom panel 130 (shown in FIG. 1) in the current embodiment. Top end 121 can be alternatively described as the top back edge of the tray and top end 131 can be alternatively described as the top front edge of the tray. The relative position of these parts wherein the top back edge of the tray is higher than the top front edge of the tray, together with the presence of the side walls 140, 150 (shown in FIG. 1), can result in reduced spillage of food onto the area around the elevated feeding tray apparatus 100 during feeding and can help keep facial and body hair, as well as ears in some cases, of the animal from getting into the contents of the tray. In other embodiments, however, the top back edge of the tray may be even with the front top edge of the tray or lower than the front top edge of the tray.

Figure 3:
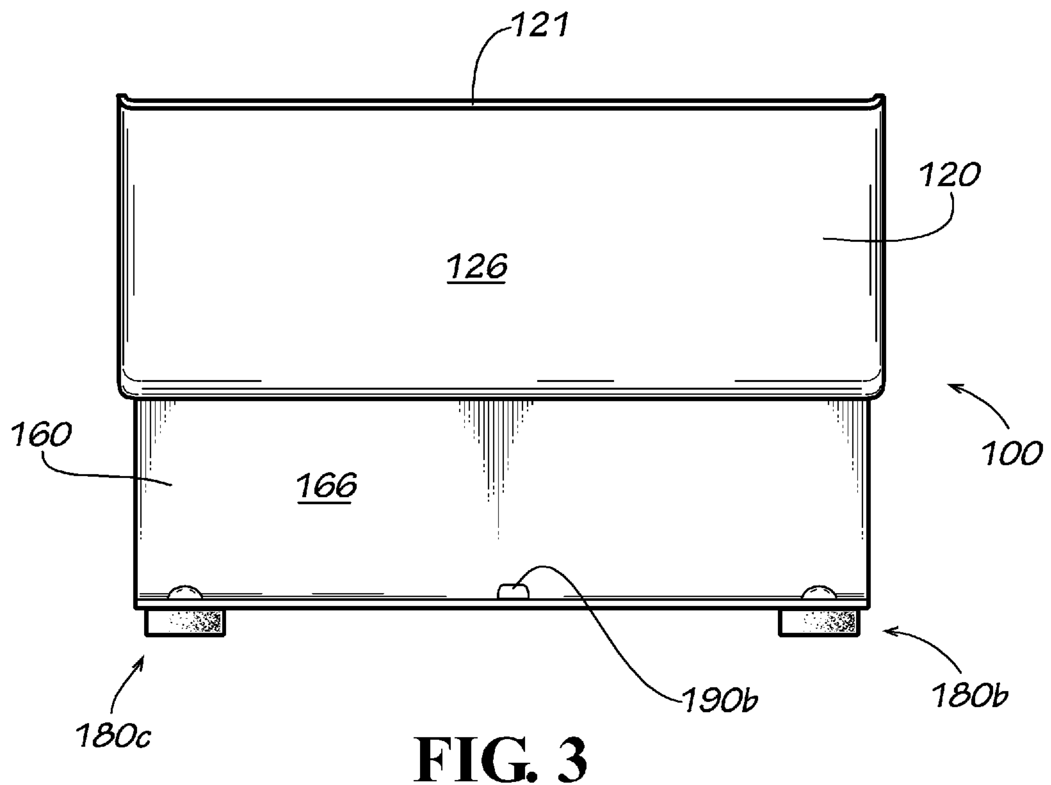
FIG. 3 is a rear view of the elevated feeding tray apparatus of FIG. 1.

FIG. 3 shows a rear view of the elevated feeding tray apparatus 100 of FIG. 1. Clearly shown in this view are feet 180*b,c*, outer surface 126 and top end 121 of rear bottom panel 120, rear surface 166 of tray riser 160, and lower indentation 190*b*.

Figure 4:
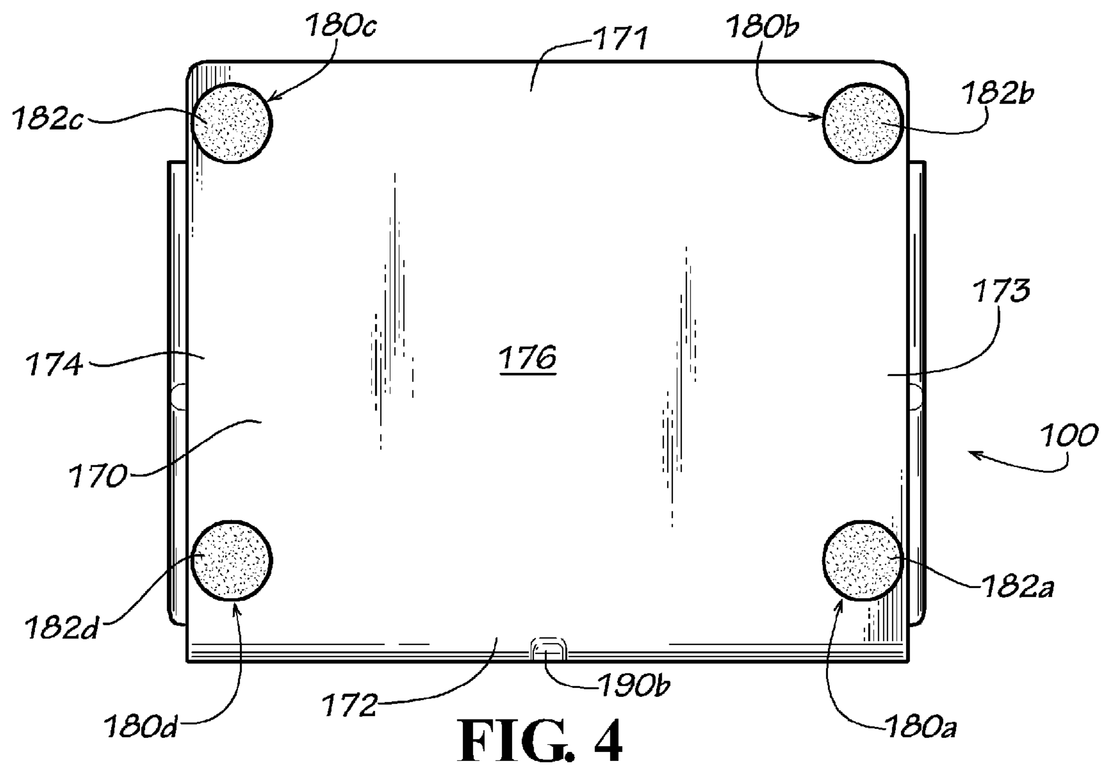
FIG. 4 is a bottom view of the elevated feeding tray apparatus of FIG. 1.

FIG. 4 shows a bottom view of the elevated feeding tray apparatus 100 of FIG. 1. Clearly shown in this view are the foot portions 182*a,b,c,d* of feet 180*a,b,c,d* as well as rear end 171, front end 172, left end 173, right end 174, and bottom surface 176 of base 170 as well as lower indentation 190*b*.

Figure 5:
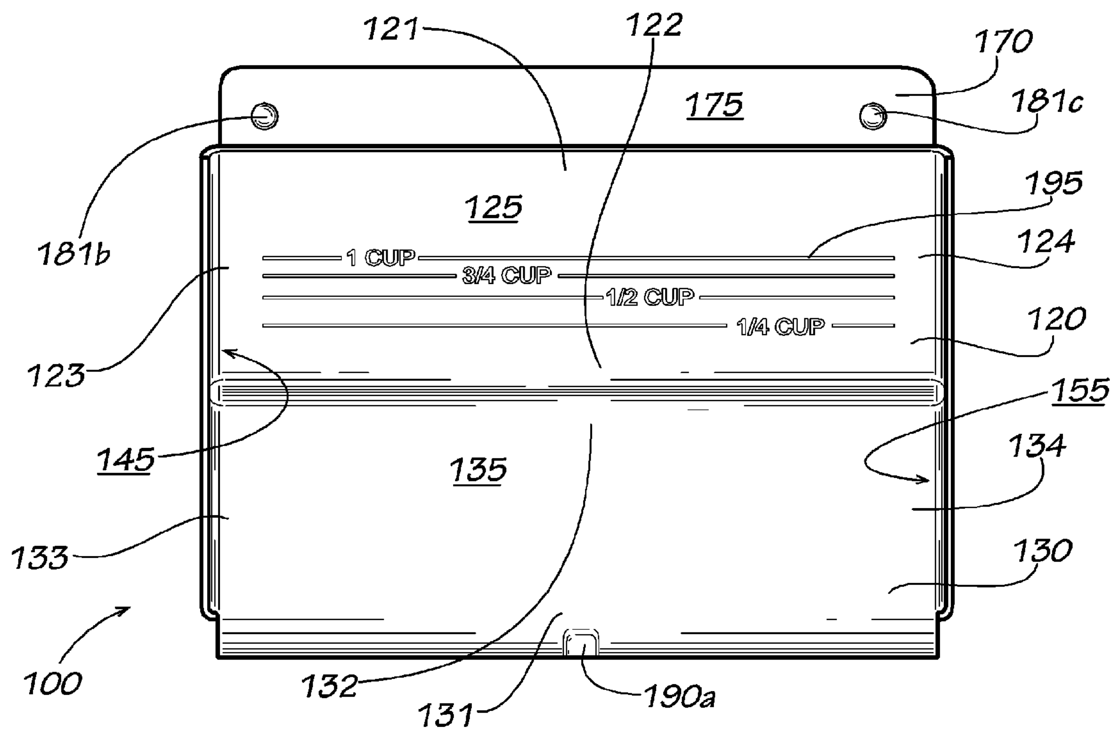
FIG. 5 is a top view of the elevated feeding tray apparatus of FIG. 1.

FIG. 5 shows a top view of the elevated feeding tray apparatus 100 of FIG. 1. Clearly shown in this view are the insert portions 181*b,c* of feet 180*b,c* (shown in FIG. 4) as well as upper indentation 190*a*, fill level indicia 195, left end 123 of rear bottom panel 120, left end 133 of front bottom panel 130, inner surface 145 of first side wall 140, inner surface 155 of second side wall 150, and top surface 175 of base 170. Also visible are top end 121, bottom end 122, right end 124, and inner surface 125 of rear bottom panel 120 and top end 131, bottom end 132, right end 134, and inner surface 135 of front bottom panel 130.

Figure 6:
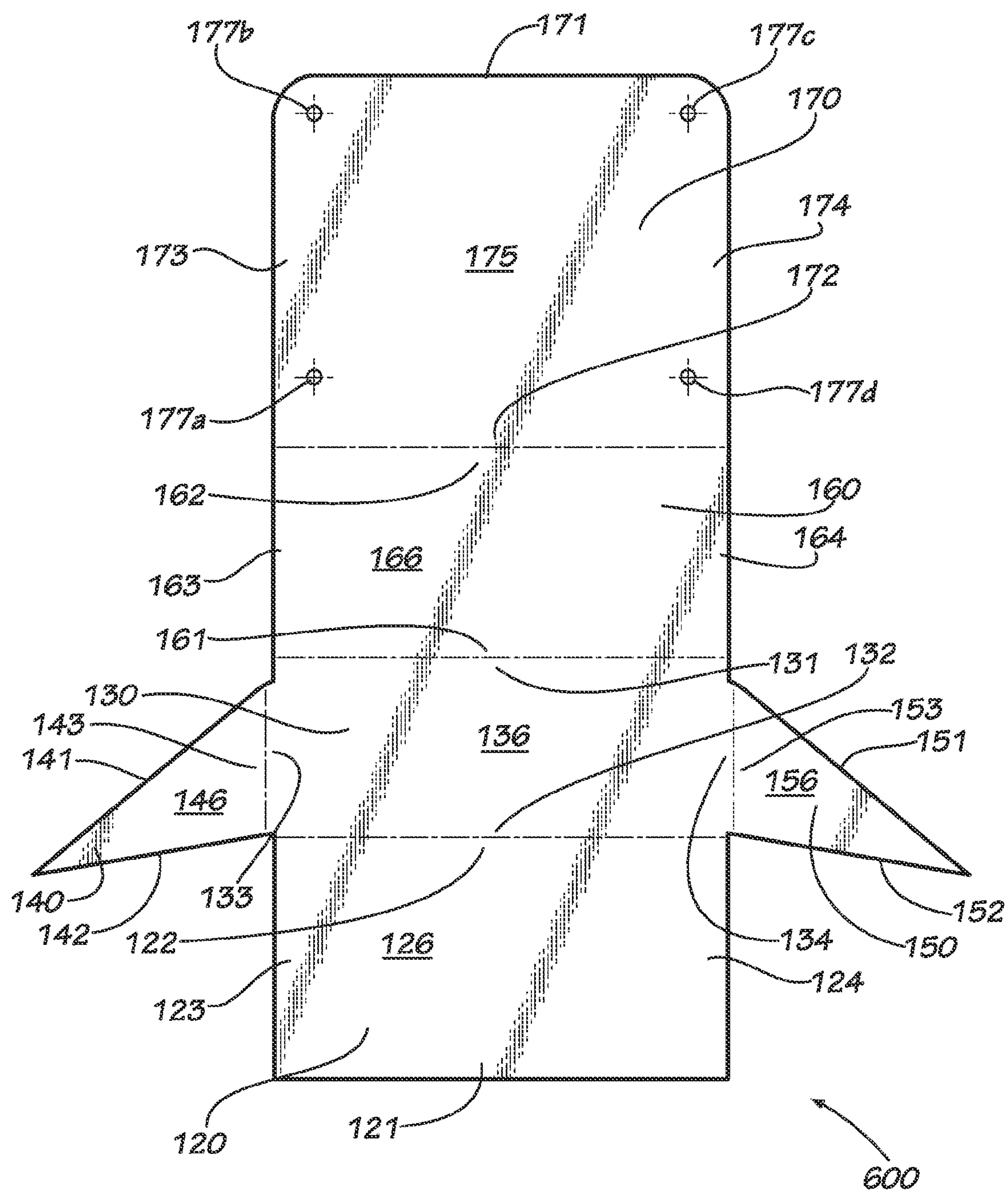
FIG. 6 is a schematic view of a blank for forming the elevated feeding tray apparatus of FIG. 1.

FIG. 6 shows a schematic view of blank 600 for forming the elevated feeding tray apparatus 100 of FIG. 1 from top surface 175 of base 170. In the current embodiment, the elevated feeding tray apparatus 100 is made of sheet metal such as but not limited to corrosion-resistant stainless steel and is designed to be bent into its final shape as shown in the perspective view of FIG. 1. It may be desirable to have a feeding container that resists corrosion, resists soiling, and is easily cleaned, and stainless steel is one type of material that may be used for these purposes. Bending can be accomplished by use of a press brake or similar equipment. As described previously, internal and external bend radii may be formed at each bend due to the nature of the process and the properties of sheet metal or may be added whether internal and external bend radii are formed by the process or not.

The schematic view in FIG. 6 of blank 600 shows front end 172 of base 170 connected to bottom end 162 of tray riser 160. Connected to top end 161 of tray riser 160 is top end 131 of front bottom panel 130. Connected to left end 133 of front bottom panel 130 is front bottom end 143 of first side wall 140. In a similar fashion, connected to right end 134 of front bottom panel 130 is front bottom end 153 of second side wall 150. Finally, connected to bottom end 132 of front bottom panel 130 is bottom end 122 of rear bottom panel 120. Included in base 170 of blank 600 are cutouts 177*a,b,c,d*. Cutouts 177*a,b,c,d* accept feet 180*a,b,c,d* in the current embodiment or can accept fasteners for attaching the tray in lieu of feet 180*a,b,c,d*. The number of shape of the cutouts can be less than or greater than what is shown. In other embodiments, the cutouts may be replaced with feet formed integrally from the blank. While the presence of four cutouts 177*a,b,c,d* may be advantageous in this embodiment by increasing the stability of the elevated feeding tray apparatus 100 once formed, a higher or lower quantity of cutouts may be advantageous in other embodiments.

Also shown in FIG. 6 are several elements of elevated feeding tray apparatus 100 that were previously introduced.

Other embodiments of the elevated feeding tray apparatus 100 could make use of a base 170 that extends beyond the tray in at least one direction to increase stability. In some embodiments, a base 170 that extends beyond tray 110 may increase the resistance of the elevated feeding tray apparatus 100 to being move or overturned. This could be made possible by increasing the size or base 170 relative to tray 110 such that in a horizontal plane defined by the base 170, the base extends beyond the tray 110 in at least one direction. An example of this is shown in FIG. 2 and in FIG. 5

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An elevated feeding tray apparatus comprising:

a tray defining a feeding cavity, the tray including a rear bottom panel and a front bottom panel connected to the rear bottom panel, each of the rear bottom panel and the front bottom panel being substantially planar, a top end of the rear bottom panel higher than a top end of the front bottom panel;

a tray riser connected to the tray bottom panel; and a base connected to the tray riser;

wherein the tray riser and base are integrally formed from substantially the same material, wherein the tray and tray riser and base are formed from a single flat blank and the tray includes substantially planar panels; the tray bottom panel including an inner surface and an outer surface, the tray riser including a front surface and a rear surface, the base including a top surface and a bottom surface; the inner surface of the tray bottom panel, the front surface of the tray riser, and the bottom surface of the base being coplanar before forming the single flat blank into the apparatus.

2. The apparatus of claim 1, wherein the tray and tray riser and base are integrally formed.

3. The apparatus of claim 1, wherein the tray is cantileverly supported from the tray riser and is formed from metal.

4. The apparatus of claim 1, wherein the tray is substantially V-shaped.

5. The apparatus of claim 1, wherein the tray defines a top back edge and a top front edge, the top front edge proximate a front of the tray and the top back edge proximate a back of the tray, and wherein the top back edge of the tray is higher than the top front edge of the tray.

6. The apparatus of claim 1, wherein the tray includes side walls, the side walls being attached to at least one tray bottom panel of the tray by watertight seams.

7. The apparatus of claim 1, wherein the tray includes fill level indicia, wherein the fill level indicia are placed on a surface of the tray.

8. The apparatus of claim 1, wherein the base includes skid control material.

9. The apparatus of claim 1 wherein an indentation is formed at a bend connecting the tray riser to the tray, the indentation configured to stiffen an intersection of the tray riser and the base.

10. A blank formable into an elevated feeding tray apparatus, the blank comprising:

a tray bottom panel, the tray bottom panel including a left end, a right end distal to the left end, an inner surface, an outer surface, a top end, and a bottom end;

a first side wall connected to the left end of the tray bottom panel by a first bend line extending from a first end of the first side wall to a second end of the first side wall, the first side wall including an inner surface and an outer surface;

a second side wall connected to the right end of the tray bottom panel by a second bend line extending from a first end of the first side wall to a second end of the first side wall, the second side wall including an inner surface and an outer surface;

a tray riser connected to the top end of the tray bottom panel, the tray riser including a front surface and a rear surface; and a base connected to the tray riser, the base including a top surface and a bottom surface;

wherein the inner surface of the tray bottom panel, the inner surface of the first side wall, the inner surface of the second side wall, the front surface of the tray riser, and the bottom surface of the base are coplanar.

11. The blank of claim 10, wherein fill level indicia are added to the tray bottom panel.

12. The blank of claim 10, wherein the outer surface of the tray bottom panel, the outer surface of the first side wall, the outer surface of the second side wall, the back surface of the tray riser, and the top surface of the base are coplanar.

13. An elevated feeding tray apparatus comprising:

a tray comprising a tray bottom panel that is substantially planar, a top end of the tray bottom panel being higher than a bottom end of the tray bottom panel, the tray bottom panel including an inner surface and an outer surface; a top front tray edge; and a top back tray edge;

a tray riser connected to the tray, the tray riser including a front surface and a rear surface;

a base connected to the tray riser, the base including a top surface and a bottom surface;

wherein the tray, the tray riser, and the base are integrally formed from substantially the same material; wherein the tray, the tray riser, and the base are formed from a single flat blank, the inner surface of the tray bottom panel, the front surface of the tray riser, and the bottom surface of the base being coplanar before forming the single flat blank into the apparatus; and wherein the top back tray edge is higher than the top front tray edge.

14. The apparatus of claim 13, further comprising fill level indicia defined by the tray bottom panel.

15. The apparatus of claim 13, wherein the material is plastic.

16. The apparatus of claim 13, further comprising an inner surface of a side wall that is substantially vertical.

17. The blank of claim 10, wherein the base defines a plurality of cutouts extending from the top surface to the bottom surface and configured to receive feet.

18. The apparatus of claim 13, wherein the tray bottom panel is a rear bottom panel, the apparatus further comprising a front bottom panel connected to the rear bottom panel, each of the rear bottom panel and the front bottom panel being substantially planar.

* * * * *